United States Patent Office 3,379,719
Patented Apr. 23, 1968

3,379,719
ION EXCHANGE FIBERS
Richard N. Rulison, Gillette, N.J., assignor to Celanese Corporation of America, New York, N.Y., a corporation of Delaware
No Drawing. Filed Sept. 29, 1964, Ser. No. 400,225
19 Claims. (Cl. 260—231)

This invention relates to ion exchange substances. More particularly, it is directed to ion exchange substances in fibrous form; and even more particularly to anion exchangers made from cellulosic fibers, both natural and regenerated.

Anionic-exchange materials capable of reducing the acidity and removing undesirable anions from water and other materials have long been known. However, the surface to volume area of these materials in their most common form, i.e., resin pellets, is somewhat low for certain applications. Moreover, such pellets cannot be shaped into varying structures and generally require special apparatus for containing them. Some disadvantages of this are that conventional ion-exchange pellets cannot be combined with other operations such as filtration, and the beds containing the pellets often result in a substantial pressure drop in a liquid system necessitating high pump capacity for moving the liquid being treated.

Ion-exchange materials have also been produced in fibrous form. However, these materials often do not have sufficient resistance to various solvents with which they may come in contact, i.e., they tend to dissolve or swell in such solvents.

It is an object of this invention to provide a novel filamentary anionic-exchange product.

It is a further object of this invention to provide a filamentary anionic-exchange product which is insoluble in most solvents.

In accordance with this invention, fibrous ion exchangers having anion exchange capacities of significant magnitude are obtained directly in a product formed by cross-linking the molecules of cellulose filaments by etherifying their hydroxyl groups with a compound of the formula $(YR')_nN(R)_{n-3}$ or $S(R'Y)_2$ where Y is halogen or a monovalent radical comprising sulfate, e.g., bisulfate or sodium sulfato, R' is an alkylene group containing at least two carbon atoms, 2–4 carbon atoms, R is alkyl, preferably lower alkyl, e.g., containing 1–4 carbon atoms and n is 2 or 3. Preferably Y is bonded to the beta carbon atom of R' with respect to the nitrogen or sulfur atom.

The preferred cross-linking reagents for reaction with cellulose are the so-called "nitrogen mustards," i.e., bis(2-chloroethyl)methylamine or tris(2-chloroethyl)amine or mustard itself, i.e., bis(2-chloroethyl)sulfide. As is well known, these are extremely active poisons and vesicants and require exceptional methods for safe handling.

The cellulose may be initially treated with a solution of cross-linking reagent in an appropriate solvent, e.g., a solution of the unmodified amine or its salt such as the hydrochloride in a polar solvent such as water, methanol, aqueous acetone, etc., or a solution of the sulfide in ethanol or benzene. The concentration of reagent may be, for example, from 5% by weight up to the saturation point in the solvent. The reagent impregnated cellulose may be dried prior to the cross-linking reaction, or the latter reaction may be carried out before drying, e.g., while the cellulose is still immersed in the reagent solution.

The cross-linking reaction is generally carried out under strongly alkaline conditions, e.g., by subjecting the reagent impregnated cellulose aqueous medium with a pH of at least 12. Suitable for this purpose are aqueous solutions of an alkali-metal hydroxide, e.g., NaOH or KOH having a concentration which, for example, may be as low as 10% by weight or as high as the saturation point of the hydroxide. The aqueous alkali may be applied to the dry or wet cellulose which was previously impregnated with cross-linking reagent, or it may be added directly to the reagent solution containing the cellulose. The temperature of the liquid media used for both the reagent impregnation and aqueous alkaline cross-linking steps may be varied widely, e.g., between room temperature and the boiling point of the medium.

In general, the amount of reagent reacted with the cellulose may be between, for example, from about 0.1 to 2 or 3 gram-millimoles per gram of cellulose. Since each molecule of reagent is theoretically capable of absorbing or exchanging one anion, this results in the cross-linked cellulose having an anion exchange capacity of about 0.1 to 2 or 3 gram-milliequivalents (meq.) per gram of original cellulose in the absence of any subsequent treatment to increase the anion-exchange capacity.

The cellulose fibers may be, for example, natural fibers such as cotton, linen, wood pulp, kapok, jute, etc., or artificial fibers such as viscose or cuprammonium rayon or saponified cellulose acetate. The cellulose fibers which are cross-linked may have any of various forms, e.g., staple fiber yarn, skeins, woven or knitted fabrics or masses of short length fibers as occur in wood pulp.

In view of limitations in the reactivity of the cross-linking reagent, the amount of ion-exchange capacity which can be introduced as a result of such capacity is somewhat limited. It is within the scope of this invention, however, to increase the ion-exchange capacity of the product by reacting some of the cellulose hydroxyl groups with an appropriate non-cross-linking reagent. Preferably this reagent is chemically related to the cross-linking reagent except that it has only a single functional group capable of reacting with the cellulose hydroxyls, rather than two functional groups. Thus, the non-cross-linking reagent may have the formula $YR'NR_2$ or $RSR'Y$, where Y, R' and R have the same meanings that they have in the type formulas of the cross-linking reagents, as given above. For example, where the cross-linking reagent is bis(2-chloroethyl)methylamine or tris(2-chloroethyl) amine, the non-cross-linking reagent is suitably 2-chloroethyldiethylamine, while when the cross-linking agent is bis(2-chloroethyl)sulfide, the non-cross-linking agent may be ethyl 2-chloroethyl sulfide. The monofunctional non-cross-linking reagent may be used, for example, in an amount of 0.1 to 2 or 3 millimoles per millimole of cross-linking reagent, to raise the ion-exchange capacity of the cellulose, for example, from about 0.1 to 2 or 3 meq., and may be reacted with the cellulose before, concurrently with or subsequent to the reaction with the cross-linking compound. The reaction and in some cases the prior impregnation with the monofunctional reagent may take place under the same conditions as described above for the cross-linking compound.

In cases where the cellulose has ben reacted with tertiary amine reagents, the amine groups may be used in unmodified form, particularly where the product is to be used for the absorption of acids in low concentration under weakly basic conditions. Alternatively, the amine groups may be quaternized with an alkyl halide, e.g., methyl or ethyl iodide, under known conditions of quaternization to obtain quarternary ammonium salt groups which may be used per se, particularly when it is desired to exchange ions, e.g., iodide, for other ions having a higher order of adsorption, e.g., hydroxide ions in basic liquids, the basicity of which is desired to be reduced, or nitrate ions. If a strongly basic cross-linked ion-exchange cellulose is desired, the product containing quaternary ammonium salt groups may be treated with a strong alkali, e.g., aqueous caustic, to exchange the salt anions for hydroxide groups.

In order to obtain an anion exchange product from cellulose cross-linked with a sulfide reagent, it is necessary to convert the sulfide groups to sulfonium ions. This may be done, for example, by reacting the product with an alkyl or aryl halide to form a sulfonium halide which may be used as such or reacted with a strong alkali to obtain the strongly basic sulfonium hydroxide. Conditions and reagents for carrying out these reactions are disclosed, for example, in Patents Nos. 2,874,131 and 2,895,925.

The possible cross-linking reaction between cellulose molecules and the cross-linking reagent may be shown schematically as follows where the word "cellulose" represents the residue of the cellulose molecule attached to the reacting hydroxy group:

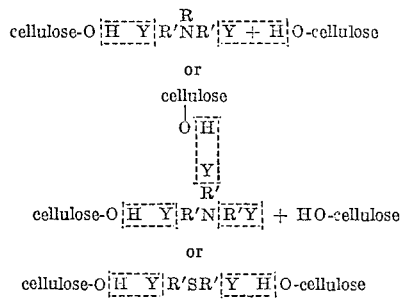

These reactions result in cross-linked cellulose in which each cellulose molecule has a plurality of bonds of the following types along its length.

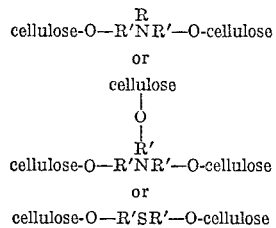

On treatment with the above described monofunctional reagents, the unreacted hydroxyl groups may also react as follows.

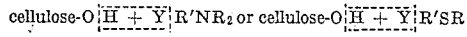

to yield a cross-linked cellulose product with a plurality of groups along the length of the molecule as follows:

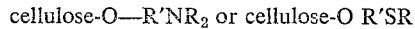

cellulose-O—R'NR$_2$ or cellulose-O R'SR

On reacting the cross-linked product with, for example, an alkyl halide, each of the nitrogen or sulfur atoms would be formed into quaternary ammonium or sulfonium groups respectively having any of the formulas

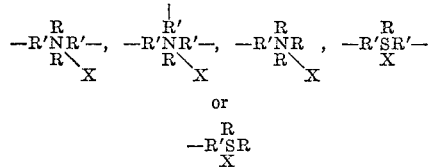

where X is halide. On further reaction with strong alkali, the halide groups are replaced with hydroxide.

In each of the above instances the alkyl (R), alkylene (R') and hydroxyl reactive (Y) groups may be the same or different. Moreover, it is possible to use a cross-linking reagent containing nitrogen and react the same product with a monofunctional ion-contributing compound containing sulfur and vice versa.

The cross-linked cellulose products of this invention are insoluble in most solvents and, in particular, in aqueous ionic liquid media as indicated by insolubility in a one molar aqueous solution of cupriethylenediamine.

The invention may be illustrated further by the following examples.

EXAMPLE 1.— Preparation of bis(2-chloroethyl) methylamine hydrochloride

One hundred fifty grams of methyl diethanolamine was added slowly to 320 g. of thionylchloride in a 500 cc. flask with stirring in an ice water bath. Using a small portion of the reaction mass (crystalline slurry), it was found that crystals could not be obtained by recrystallization from ethanol. Consequently, in order to isolate a purified product the bulk of the reaction mixture was brought into solution by the addition of 100 cc. water and the free amine liberated from the hydrochloride form by addition of sufficient 10% NaOH solution to give a phenolphthalein color change. The free amine was extracted with ether and the ether solution left over anhydrous calcium sulfate overnight to remove water. Following filtration of the dry solution; dry hydrogen chloride was passed into the solution to form insoluble, white crystals of the amine hydrochloride. The crystals were filtered, washed with dry ether, and dried under vacuum over anhydrous calcium sulfate.

Cellulose cross-linking reaction 5.5 grams of air-dry viscous staple fiber (5.5 dpf, 3 inch, 8% H$_2$O) was saturated with a solution of 5 g. of bis(2-chloroethyl)methylamine hydrochloride prepared as described above in 20 cc. of water. 25 cc. of 50% NaOH solution was added with thorough mixing and the mixture stored at room temperature for 16 hours. The mixture was then acidified with 50% H$_2$SO$_4$ to eliminate the remaining free amine. The fibrous product was washed thoroughly to remove all unreacted reagents and soluble by-products. The fiber was then soaked for one hour in dilute NaOH solution at a pH of 12.0. It was washed neutral with boiled distilled water, rinsed with acetone and dried. The yield was 5.8 g. oven-dry, or about 115% based on the starting cellulose (dry basis).

The actual anion exchange capacity was 1.05 milli-equivalents per gram as measured by equilibration of the resulting ion exchange fiber with one normal NH$_4$Cl solution. This compares with the nitrogen content of 0.93 milli-equivalents per gram for the fiber.

The existence of intermolecular cross-linking in the treated fiber was shown by its insolubility in one molar cupriethylenediamine hydroxide solution.

The product has a plurality of bonds of the formula

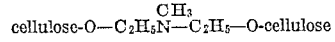

where "cellulose" is the residue of a cellulose molecule. The product could be further reacted with an alkyl halide to produce the corresponding quaternary ammonium halide, which could then be further reacted with caustic to produce the quaternary ammonium hydroxide.

EXAMPLE 2

Five grams of oven-dry, ether-extracted viscose staple (5.5 dpf, 3 inch cut) was saturated with a solution made up of 5 g. bis(2-chloroethyl)methylamine hydrochloride, 8 cc. water, and 25 cc. acetone. The resulting mixture was dried in a stream of hot air at 95–115° C. for 30 minutes to yield dry cellulose fiber in intimate contact with the amine salt reagent. 25 cc. of 50% NaOH were added and the mixture thoroughly stirred. The reaction container was flushed with nitrogen to remove most of the oxygen in order to minimize degradation of the cellulose and the mixture was left for 23 hours at room temperature (28° C.)

The mixture was next acidified with 10% H$_2$SO$_4$, washed, and then soaked in dilute NaOH at a pH of 11.8 to liberate free tertiary amine groups on the treated fibers. The fibrous product was then washed neutral with boiled distilled water, rinsed with acetone and dried. The oven-dry yield was 5.6 g. or 112% based on the starting cellulose. The nitrogen analysis on the resulting fiber was 0.08 meq./g. Equilibration with one normal NH$_4$Cl gave an anion exchange capacity value of 0.52 meq./g. The anion exchange fiber product was insoluble in cupriethylenediamine solution.

EXAMPLE 3

Five grams of open-dry, ether-extracted pima cotton staple fiber was treated identically as was the viscose staple fiber of Example 2. The oven-dry yield of treated fiber was 5.36 g. or 107%. The nitrogen analysis was 0.34 meq./g. Equilibration with one normal aqueous solution of $NH_4Cl$ gave an anion exchange capacity value of 0.49 meq./g. The anion exchange fiber product was insoluble in cupriethylenediamine solution.

The products of Examples 2 and 3 have cross-linking bonds of the type shown in Example 1.

EXAMPLE 4.—Preparation of tris(2-chloroethyl)amine hydrochloride

Twenty grams of triethanolamine was added slowly to 50 g. trionylchloride. The reaction residue was dissolved in 50 cc. absolute ethanol and the solution cooled in ice water. The white crystals formed were filtered out, rinsed repeatedly with cold ethanol, and dried under vacuum over anhydrous calcium sulfate.

Cellulose cross-linking reaction

Two grams of tris (2-chloroethyl)amine hydrochloride was dissolved in 10 cc. of dry methanol and the resulting solution was absorbed into 2 g. of oven-dry, ether-extracted, raw pima cotton fiber. The wet cotton was dried for 20 minutes at 95–115° C. to evaporate the methanol. To the dry, amine salt-impregnated cotton was added 10 cc. of 50% NaOH solution. The initial reaction between the hydrochloride of the amine and the sodium hydroxide raised the temperature to about 35° C. The temperature dropped back to room temperature in a few minutes and the reaction mixture was left 17 hours at room temperature. The mixture was then acidified with 10% $H_2SO_4$, washed, soaked 60 minutes at pH 11.8 in dilute NaOH to liberate free tertiary amine groups on the cellulose, washed neutral with boiled distilled water, rinsed with acetone and dried. The nitrogen content was analysed as 0.20 meq./g. Equilibration of a portion of the fibrous product with one normal $NH_4Cl$ gave an anion exchange capacity value of 0.12 meq./g.

The product has a plurality of cross-linking bonds of the formula

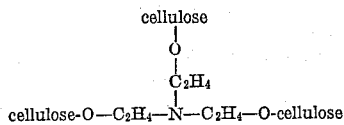

EXAMPLE 5

One gram bis(2-chloroethyl)methylamine hydrochloride was dissolved in 5 cc. methanol and the resulting solution absorbed into 1 g. oven-dry, ether-extracted viscose rayon staple fiber. The wet fiber was then dried 20 minutes in a stream of forced air at 95–115° C. 5 g. of 24.6% NaOH was added and worked into the dry, amine salt-impregnated, cellulose fiber. This mixture was stored over-night (16 hrs.) at room temperature (23–30°) for the etherification reaction to occur. The mixture was then acidified with 10% $H_2SO_4$ to solubilize the free amine reagent and by-products. The fiber was then washed and soaked for 30 minutes in dilute NaOH at a pH of 12 to liberate free tertiary amine groups in the cellulose. It was then washed neutral with boiled distilled water, rinsed with acetone and dried. Analysis of the resulting anion exchange fiber showed a nitrogen content of 0.6%.

EXAMPLE 6

The procedure of Example 5 was repeated, substituting 1 g. of oven-dry, ether-extracted, raw pima cotton for the viscose fiber. Analysis of the resulting anion exchange fiber showed a nitrogen content of 0.5%.

The products of Examples 5 and 6 have cross-linking bonds of the type shown in Example 1.

EXAMPLE 7

One gram of 2-chlorotriethylamine hydrochloride, a conventional, non-cross-linking, aminizing agent for cellulose, was dissolved in 5 cc. of methanol and the resulting solution absorbed into 1 g. of the already aminized and cross-linked product of Example 1. The wet fiber was then dried 20 minutes in a stream of forced air at 95–115° C. 5.1 g. of 24.6% NaOH was added and worked into the dry, amine salt-impregnated, cellulose fiber. This mixture was stored overnight (16 hr.) at room temperature (23–30°) for the etherification reaction to occur. The mixture was then acidified with 10% $H_2SO_4$ to solubilize the free amine reagent and by-products. The fiber was then washed and soaked for 30 minutes in dilute NaOH at a pH of 12 to liberate free tertiary amine groups. It was then washed neutral with boiled distilled water, rinsed with acetone and dried. Analysis of the fiber from this second aminization showed a nitrogen content of 2.05 meq./g. as compared to only 1.05 meq./g. for the fiber from the first aminization.

In addition to cross-linking bonds of the type shown in Example 1, the product has a plurality of non-cross-linking ionizable groups having the formula:

$$\text{cellulose-O}—C_2H_4N(C_2H_5)_2$$

While the invention has been described primarily with respect to cellulose cross-linked with certain amine and sulfide groups and their corresponding quaternary ammonium and sulfonium halides and hydroxides, it is obvious that the halide and hydroxide groups may be exchanged by a wide variety of anions which may in turn be readily exchangeable and may be more suitable or desirable for various end uses. Thus, the invention contemplates quaternary ammonium or sulfonium compounds having the following formulas:

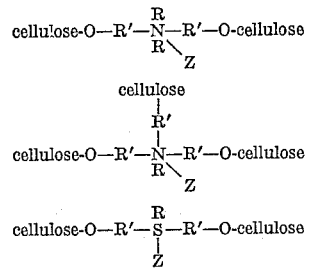

where Z is any exchangeable anion and the other symbols in the formulas have the meanings given to them previously.

Although the product of the invention has its greatest utility in the form of fibers, it may also taken the form of films and sheets, e.g., obtained when cellophane is treated with the disclosed cross-linking reagents, beads, pellets, powder, flake, etc.

In addition to the utility disclosed previously, the product of the invention when in the form of extremely short cross-linked fibers are suitable for the manufacture of paper-like products when admixed with pure unmodified cellulose pulp. These products find application as chromatographic papers and as filter papers possessing the additional property of anion exchange.

In the bulky, short fiber form as well as in longer staple fiber form, the cross-linked anion-exchange product may be used as a component of acetate, polyester or polyolefin fiber arrays for the treatment of both gaseous and liquid media.

It is to be understood that the foregoing detailed description is given merely by way of illustration and that many variations may be made therein without departing from the spirit of my invention.

The embodiments of the invention in which an exclusive property or privilege is claimed are defined as follows:

1. A cross-linked cellulosic product, said cellulosic product having been cross-linked to a substantially insoluble state in a 1 molar aqueous solution of cupriethylenediamine and having an ion-exchange capacity of from about 0.1 to about 3 milliequivalents per gram of original cellulose, the molecules of which have a plurality of bonds having a formula selected from the group consisting of

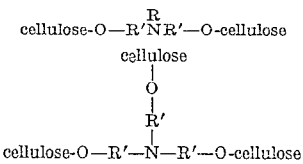

and cellulose-O—R'—S—R'—O-cellulose where "cellulose" is the residue of a cellulose molecule, R' is alkylene containing at least 2 carbon atoms and R is alkyl.

2. The product of claim 1 in fibrous form.
3. A salt of the product of claim 1.
4. A cross-linked cellulosic product, said cellulosic product having been cross-linked to a substantially insoluble state in a 1 molar aqueous solution of cupriethylenediamine and having an ion-exchange capacity of from about 0.1 to about 3 milliequivalents per gram of original cellulose, having a plurality of bonds having a formula selected from the group consisting of

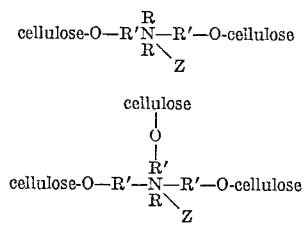

and

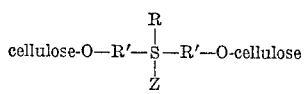

where "cellulose" is the residue of a cellulose molecule, R' is alkylene containing at least two carbon atoms, R is alkyl and Z is an exchangeable anion.

5. The product of claim 1, the molecules of which also contain a plurality of non-cross-linked bonds selected from the group consisting of cellulose-O—R'NR$_2$ and cellulose-O—R'SR.

6. The product of claim 4, the molecules of which also contain a plurality of non-cross-linked bonds selected from the group consisting of cellulose-O—R'NR$_2$Z and cellulose-O—R'SR$_2$Z.

7. A cross-linked cellulosic product, said cellulosic product having been cross-linked to a substantially insoluble state in a 1 molar aqueous solution of cupriethylenediamine and having an ion-exchange capacity of from about 0.1 to about 3 milliequivalents per gram of original cellulose, the molecules of which have a plurality of bonds having the formula cellulose-O—C$_2$H$_4$—N(CH$_3$)C$_2$H$_4$—O-cellulose where "cellulose" is the residue of a cellulose molecule.

8. A cross-linked cellulosic product, said cellulosic product having been cross-linked to a substantially insoluble state in a 1 molar aqueous solution of cupriethylenediamine and having an ion-exchange capacity of from about 0.1 to about 3 milliequivalents per gram of original cellulose, the molecules of which have a plurality of bonds having the formula

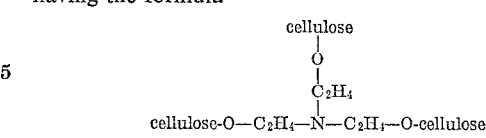

where "cellulose" is the residue of a cellulose molecule.

9. A process comprising reacting cellulose under alkaline conditions at a pH of at least about 12 with a cross-linking reagent having a formula selected from the group consising of (YR')$_n$N(R)$_{n-3}$ and S(R'Y)$_2$ where Y is selected from the group consisting of halogen and monovalent radicals comprising sulfate, R' is alkylene containing at least two carbon atoms, R is alkyl and $n$ is an integer from 2 to 3 reacting said cellulose under said alkaline conditions to a substantially insoluble state in a 1 molar aqueous solution of cupriethylenediamine.

10. The process of claim 9 wherein said cellulose is in fibrous form.

11. The process of claim 9 wherein said cellulose is further reacted with a non-cross-linking reagent having a formula selected from the group consisting of YR'NR$_2$ and RSR'Y.

12. A process comprising reacting cellulose under alkaline conditions at a pH of at least about 12 with bis(2-chloroethyl)methylamine.

13. A process comprising reacting cellulose under alkaline conditions at a pH of at least about 12 with tris(2-chloroethyl)amine.

14. The process of claim 12 wherein said cellulose is further reacted with 2-chloroethyldiethylamine.

15. The process of claim 14 wherein said cellulose is further reacted with 2-chloroethyldiethylamine.

16. A cross-linked cellulosic product, said cellulosic product having been cross-linked to the degree wherein it is insoluble in a 1 molar solution of aqueous ethylenediamine, the molecules of which have a plurality of bonds having the formula cellulose-O—C$_2$H$_4$—N(CH$_3$)C$_2$H$_4$—O-cellulose where "cellulose" is the residue of a cellulose molecule, said molecules of said cellulosic product also containing a plurality of non-cross-linked bonds having the formula cellulose-O—C$_2$H$_4$N(C$_2$H$_5$)$_2$ said cellulosic product having an ion-exchange capacity of from about 0.2 to about 6 milliequivalents per gram of original cellulose.

17. A cross-linked cellulosic product, said cellulosic product having been cross-linked to the degree wherein it is insoluble in a 1 molar solution of aqueous cupriethylenediamine, the molecules of which have a plurality of bonds having the formula

where "cellulose" is the residue of a cellulose molecule, said molecules of said cellulosic product also containing a plurality of non-cross-linked bonds having the formula cellulose-O—C$_2$H$_4$N(C$_2$H$_5$)$_2$ said cellulosic product having an ion-exchange capacity of from about 0.2 to about 6 milliequivalents per gram of original cellulose.

18. The process of claim 9 wherein the cross-linking reagent is reacted in an amount of from about 0.1 to about 3 gram-millimoles per gram of cellulose.

19. The process of claim 18 wherein the cross-linking reagent is dissolved in a solvent which is held at a temperature from about room temperature to the boiling point of said solvent, said cross-linking reagent being present in said solvent at a concentration of from about 5 percent by weight up to the saturation point in the solvent.

References Cited

UNITED STATES PATENTS

| | | | |
|---|---|---|---|
| 3,246,946 | 4/1966 | Gardon | 8—116.3 |
| 3,238,192 | 3/1966 | Taylor | 260—212 XR |
| 3,055,729 | 9/1962 | Richter et al. | 260—2.1 XR |
| 2,933,460 | 4/1960 | Richter et al. | 260—2.1 |
| 2,418,938 | 4/1947 | Izard | 260—212 XR |

DONALD E. CZAJA, *Primary Examiner.*

LEON J. BERCOVITZ, *Examiner.*

R. W. MULCAHY, *Assistant Examiner.*